April 23, 1968  F. PAPKE  3,379,092
ALBADA TYPE VIEWFINDER WITH REDUCTION OF
INTERFERENCE DUE TO REFLECTED LIGHT RAYS
Filed July 5, 1963  2 Sheets-Sheet 1

3,379,092
ALBADA TYPE VIEWFINDER WITH REDUCTION OF INTERFERENCE DUE TO REFLECTED LIGHT RAYS

Friedrich Papke, Braunschweig, Germany, assignor to Voigtlander, A.G., Braunschweig, Germany, a corporation of Germany
Filed July 5, 1963, Ser. No. 293,052
Claims priority, application Germany, July 7, 1962, V 22,757
3 Claims. (Cl. 88—1.5)

ABSTRACT OF THE DISCLOSURE

An Albada type viewfinder having a front lens which is transparent and provided with a concave inner face. A partially light permeable concave mirror is situated on the concave inner face of the front lens. A reflecting picture limiting frame is positioned substantially in the focal plane of the mirror to be imaged thereby substantially at infinity in the eye of an observer. A laterally opaque housing mounts the front lens and the frame with an air gap therebetween. A substantially flat plate component of transparent material closes the eye end of the housing. This latter component is mounted, by a suitable mounting structure, in a position inclined with respect to a plane which is perpendicular to the optical axis of the viewfinder, at an acute angle which will reflect light rays from the surface of the flat component out of the path of light rays reaching the eye of an observer through the viewfinder.

---

This invention relates to Albada type viewfinders such as used with photographic cameras, and, more particularly, to an improved viewfinder of this type in which the interference with image viewing, due to light rays reflected from the air contacted surfaces of transparent elements, is substantially reduced if not eliminated.

A known rather simple Albada viewfinder for photographic cameras, having a magnefication ratio of 1:1, includes a front nonrefracting lens, which may be of the meniscus type but which, in any event, has a concave inner surface facing toward the eye of the viewer. This concave inner surface is provided with a partially light permeable mirror, either by deposition of a mirrored surface thereon or by mounting of a frame-shaped mirror thereon. Approximately in the focal plane of the partially permeable mirror there is located a reflecting picture limiting or picture defining frame, which is thus reflected as substantially infinity by the concave mirror acting in the nature of a collimator. Thus, the reflecting picture limiting frame appears, to the eye of a viewer, as superimposed on the picture area.

Both the front lens, carrying the concave mirror, and the picture limiting frame to be imaged thereby are usually mounted in a laterally opaque housing which includes a transparent plate, such as a glass plate, at the end facing the eye of the viewer. Frequently, the picture limiting frame is positioned on this transparent plate so that the latter simultaneously performs the function of supporting the picture limiting frame. This type of design has the advantage of simplicity and small expense. However, a disadvantage thereof is that light ray reflections occur at the surface or surfaces of the transparent plate in contact with air, and these reflected light rays are superimposed on the image in the finder. The superimposed reflcted light rays may reduce the contrast of the image, particularly if the illumination is poor. The transparent plate has hitherto been mounted so as to be perpendicular to the optical axis of the viewfinder.

The principal object of the present invention is to provide an Albada viewfinder of this general type in which the interference by the thus reflected rays is substantially reduced if not eliminated.

In accordance with the invention, this object is accomplished by positioning the transparent flat plate of glass or plastic, forming the eye end of the finder housing, so that it is at an angle to the optical axis other than an angle of 90 degrees. In other words, the flat plate is so inclined that the rays which are reflected from its surface or surfaces to the concave mirror are deflected by the latter toward the sides, or laterally, of the viewfinder to an extent such that they will not reach the eye of an observer in the position in which the viewfinder is used to observe a scene to be photographed. Thus, these reflected rays are substantially invisible to a viewer and do not disturb his view of the image.

For an understanding of the principles of the invention, reference is made to the following description of typical embodiments thereof as illustrated in the accompanying drawings. In the drawings.

Figure 1:
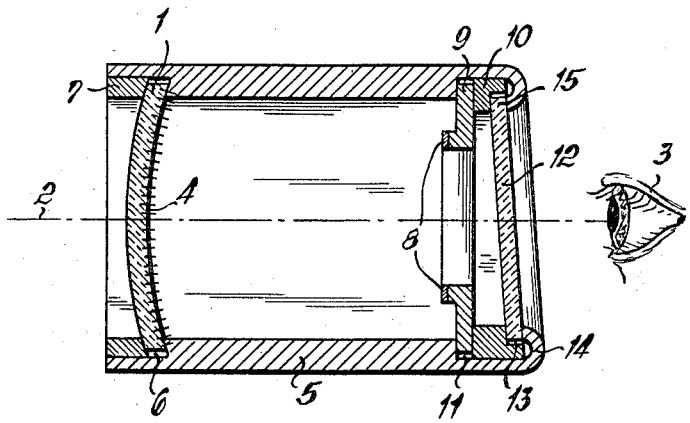
FIGS. 1 and 2 are longitudinal or axial sectional views through two different embodiments of an Albada type viewfinder in accordance with the invention.

Referring first to the embodiment of the invention illustrated in FIG. 1, an Albada type viewfinder in accordance with the invention is illustrated as including a front lens 1 which is a nonrefractive meniscus lens having a concave inner surface facing the eye 3 of an observer looking through the viewfinder along the optical axis 2. This inner concave surface of the lens 1 has thereon a partially light-permeable concave mirror 4 which may be, for example, vacuum-deposited thereon. Lens 1 is supported in housing 5 of the viewfinder, by way of example, by seating into a recess 6 in which it is retained by a retainer or frame 7.

The picture limiting frame is indicated at 8, this being a highly light reflective metallic frame. Frame 8 is supported by a relatively narrow ring 9. However, frame 8 could, in a known manner, be located on the surface of a transparent plate facing toward the object. For example, such a plate could have a frame-shaped recess corresponding to the frame and this recess could be made reflective by vacuum deposition or other known methods.

In the particular arrangement illustrated in FIG. 1, the frame supporting ring 9 is seated in a recess 11 and is held in position by a frame-shape ring 10 which is also inserted into the recess 11. Ring 10 is furthermore constructed to receive the flat transparent closure plate 12, being provided, for this purpose, with a recess 13 in which the plate 12 is seated. All of the mentioned parts may be secured to housing 5 by suitable adhesives, and such adhesives may be used to secure the parts 9, 10 and 12 to each other. The assembly is maintained in position by the inturned edge or rim 14 of housing 5.

Of course, it will be understood that the parts just mentioned could be maintained in position solely by adhesives, could be anchored against a stop other than the inturned rim 14, or could be retained assembled by any other suitable means.

In accordance with the invention, the substantially flat transparent closure plate 12 is inclined, with reference to the usual position normal to optical axis 2, by four degrees. In other words, the general plane of plate 12 makes an angle of four degrees with a plane perpendicular to the optical axis 2. With a relatively small angle, the direction from which the stray light principally comes should be taken into consideration. Usually the stray light, in photographic cameras, comes from the upper part of object space. In such case, the closure plate 12 is inclined with its upper edge 15 toward the objective.

Figure 2:
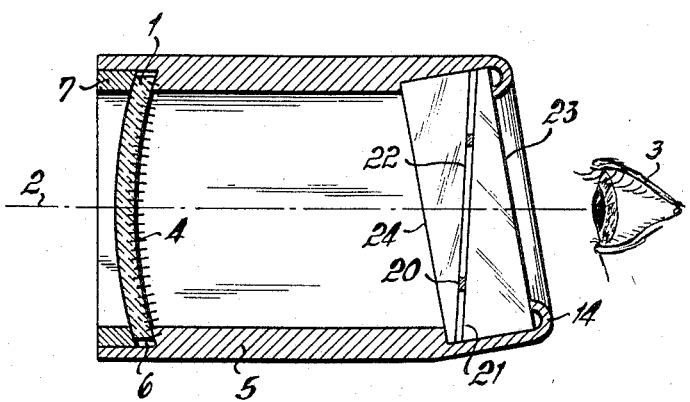

In most respects, the embodiment of the invention shown in FIG. 2 is identical with that shown in FIG. 1 and, for this reason, the same reference characters have been used to indicate identical or similar parts.

In the embodiment of FIG. 2, however, the picture limiting frame 20 is positioned in a known manner between two transparent plates which are cemented to each other. The cemented interface between the two plates is inclined, in a known manner, with respect to a plane normal or perpendicular to the optical axis 2. Such an arrangement is shown, for example, in Austrian Patent 201,429, and the inclination of the interface 22 carrying the frame 20 is such that the frame will receive the optimum illumination under the expected conditions of use. The angle of inclination is generally from two degrees to four degrees with reference to a plane normal or perpendicular to the optical axis, and the interface 22 is so inclined that its upper edge is nearer to the eye of a viewer.

However, the plano-parallel outer surfaces of the means carrying the frame 20 are inclined in the opposite direction with respect to a plane normal or perpendicular to the optical axis 2. This is for the purpose of preventing light rays reflected from these surfaces from being deflected by the partially permeable concave mirror 4 into the eye of a viewer. The inclination of the parallel outer surfaces 23 and 24 of the frame-carrying members, with respect to a plane perpendicular or normal to the optical axis, is between two degrees and ten degrees, with the upper edges of these surfaces being inclined toward the object end of the viewfinder.

By the arrangement of FIG. 2, there is provided, without any additional parts, an Albada finder which is substantially completely free of interference from light rays reflected from the outer surfaces 23 and 24 of the frame carrier. In this embodiment, the two plates cemented to each other provide the function of supporting the frame and also that of the inclined surfaces deflecting the interfering light rays. The embodiment has properties which are greatly improved even over an arrangement in which a block carrying the picture limiting frame, and including the inclined cemented interface 22, is made as a plano-parallel plate placed perpendicularly to the optical axis 2. The reason for this is that, in such a design, it is necessary further to provide an inclined closure plate, such as shown at 12, in FIG. 1, in order to eliminate disturbing light rays reflected to the eye of the viewer.

Figure 3:
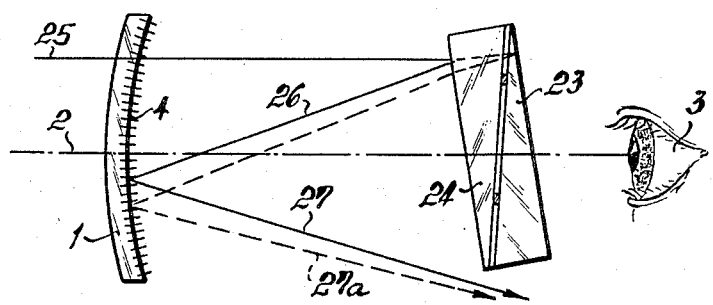
FIG. 3 is a view schematically illustrating the light ray paths in the viewfinder of FIG. 2.

As stated, FIG. 3 is a schematic illustration of the path of the light rays in the embodiment shown in FIG. 2. If a light ray 25 enters parallel to optical axis 2 through the partially permeable mirror 4, such light ray will strike the inclined and parallel outer surfaces 23 and 24 of the transparent plate means supporting the frame 20. Reflection of light ray 25 occurs at both of the glass-air interfaces 23 and 24. The reflected light rays 26 impinge upon the partially permeable mirror 4, but are deflected, as light rays 27 and 27a, laterally of the viewfinder and laterally of the transparent plate means supporting the picture limiting frame 20. Thus, these reflected light rays 26, 27 and 27a are directed out of the path of view of an observer looking along the optical axis 2 so that they do not provide any interference to the image as viewed by the eye 3 of an observer.

Figure 4:
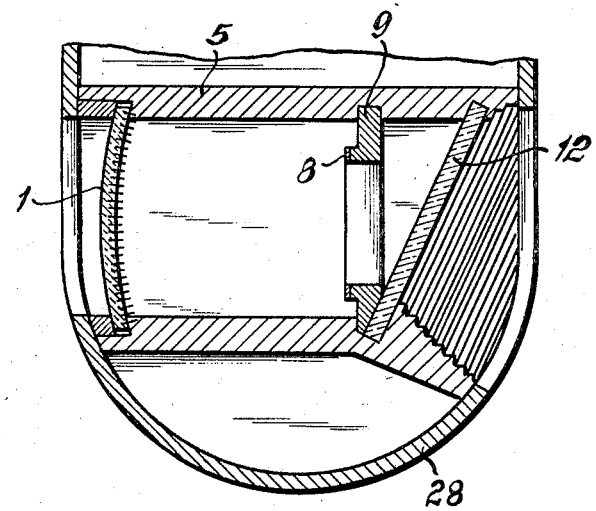
FIG. 4 is a horizontal sectional view through another embodiment of Albada viewfinder in accordance with the invention and arranged to be positioned within the hood or cover of a camera.

FIG. 4 illustrates an embodiment in which the closure plate 12 of the Albada viewfinder is inclined about an axis different from that of the embodiments of FIGS. 1 and 2. In the embodiment of FIG. 4, plate 12 is angularly displaced about its vertical axis and to a degree much greater than in the embodiments of FIGS. 1 and 2. This greater angular displacement is provided in order to eliminate any visible reflections of the stray light which strike the surfaces of plate 12. With respect to a plane perpendicular to the optical axis of the viewfinder shown in FIG. 4, the plate 12 therein is inclined an amount of the order of twenty degrees. This substantially greater angle of inclination requires a shell-like viewing opening for the housing 5, which affords particular advantages in the use of the viewfinder. End plate 12 forms an angle, with a plane perpendicular to the optical axis of the viewfinder, sufficiently large that it is impossible for rays reflected from the surfaces of plate 12 to be directed by mirror 4 into the eye of a viewer. Thus, even stray light of high intensity has practically no effect upon the appearance of the image as viewed through the viewfinder.

If the shell-like eye opening of housing 5, as shown in FIG. 4, is placed in the round section of a camera hood 28, and particularly adjacent the lower part thereof, there is provided very advantageous protection against any stray light from the rear, during the use of the viewfinder, reaching the plate 12, as the nose of the observer will act as an effective screen.

While specific embodiments of the invention have been shown and described in detail to illustrate the application of the principles of the invention, it will be understood that the invention may be embodied otherwise without departing from such principles.

What is claimed is:

1. An Albada type viewfinder comprising, in combination, a front lens of transparent material having a concave inner face; means forming a partially light permeable concave mirror on said concave inner surface; a reflecting picture limiting frame positioned substantially in the focal plane of said mirror for imaging thereby at substantially infinity in the eye of an observer; a laterally opaque housing mounting said front lens and said frame in air gap spaced relation; a substantially flat plate component of transparent material closing the eye end of said housing; and means mounting said component inclined, with respect to a plane perpendicular to the optical axis of the viewfinder, at an acute angle such that rays reflected from its surfaces are deflected out of the path of light rays reaching the eye of an observer looking through the viewfinder, said frame being carried by said component, and said substantially flat component comprising a pair of blocks of transparent material cemented together at an interface; said frame being carried in said interface; the outer surfaces of the unit formed by said blocks being substantially flat and parallel to each other and disposed at said acute angle relative to a plane perpendicular to the optical axis of the viewfinder; said interface lying in a plane which is oblique to the substantially flat outer faces of said unit, said interface being inclined, with respect to a plane perpendicular to the optical axis of the viewfinder, at an acute angle and in a direction opposite to the direction of inclination of said flat outer surfaces of said unit.

2. An Albada type viewfinder, as claimed in claim 1, in which such inclination of the substantially flat outer surfaces of the unit is from two degrees to ten degrees.

3. An Albada type viewfinder, as claimed in claim 2, in which the inclination of said interface is from two degrees to four degrees.

References Cited

UNITED STATES PATENTS 3,182,546  5/1965  Papke _____ 88—1.5

FOREIGN PATENTS 853,622  11/1960  Great Britain.
526,078  5/1955  Italy.

DAVID H. RUBIN, *Primary Examiner.*
JEWELL H. PEDERSEN, *Examiner.*
R. J. STERN, *Assistant Examiner.*